(12) United States Patent
Benson

(10) Patent No.: US 12,168,896 B2
(45) Date of Patent: Dec. 17, 2024

(54) BACKDOOR ASSEMBLIES FOR VEHICLES

(71) Applicant: Toyota Motor Engineering & Manufacturing North America, Inc., Plano, TX (US)

(72) Inventor: Blaine C. Benson, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 235 days.

(21) Appl. No.: 17/879,568

(22) Filed: Aug. 2, 2022

(65) Prior Publication Data
US 2024/0044185 A1   Feb. 8, 2024

(51) Int. Cl.
*B60J 5/10* (2006.01)
*E05B 79/20* (2014.01)
*E05B 81/56* (2014.01)
*E05B 83/16* (2014.01)

(52) U.S. Cl.
CPC ............ *E05B 83/16* (2013.01); *B60J 5/107* (2013.01); *E05B 79/20* (2013.01); *E05B 81/56* (2013.01)

(58) Field of Classification Search
CPC . B60J 5/101; B60J 5/108; E05B 83/16; E05B 83/18; E05B 83/42; E05B 83/44
USPC ..... 296/146.8, 106, 56; 292/DIG. 25, 23, 29
See application file for complete search history.

(56) References Cited

U.S. PATENT DOCUMENTS

| | | | | |
|---|---|---|---|---|
| 3,454,299 A | * | 7/1969 | Hewitt | B62D 33/0273 296/57.1 |
| 4,691,956 A | * | 9/1987 | Hodge | B60P 1/26 296/57.1 |
| 6,764,130 B1 | * | 7/2004 | Hull | B60P 1/26 296/57.1 |
| 6,827,386 B2 | * | 12/2004 | Stevenson | B62D 33/0273 296/51 |
| 7,011,357 B2 | | 3/2006 | Seksaria et al. | |
| 7,537,267 B2 | | 5/2009 | Tanaka et al. | |
| 8,061,753 B2 | * | 11/2011 | Papanikolaou | B62D 33/0273 296/146.12 |
| 8,567,841 B2 | | 10/2013 | Ginestet et al. | |
| 9,162,554 B2 | | 10/2015 | Iwano et al. | |

(Continued)

FOREIGN PATENT DOCUMENTS

| | | | |
|---|---|---|---|
| JP | 6422268 B2 | 11/2018 | |
| KR | 101913703 B1 * | 11/2018 | ........... B62D 33/023 |

OTHER PUBLICATIONS

KR101913703 Text (Year: 2018).*

*Primary Examiner* — Dennis H Pedder
(74) *Attorney, Agent, or Firm* — Dinsmore & Shohl LLP

(57) ABSTRACT

A back door assembly includes a door; a pair of hinges that rotatably couple the door to a frame of the vehicle, the pair of hinges define an axis of rotation about which the door is rotatable; and a pair of latching mechanisms configured to secure the door to the frame, the pair of latching mechanisms are spaced apart from the pair of hinges in a vehicle vertical direction when the door is in a closed position, the pair of latching mechanisms are aligned with the pair of hinges in the vehicle vertical direction when the door is in the closed position such that an axis extending through the pair of latching mechanisms is substantially parallel to the axis of rotation of the pair of hinges.

8 Claims, 4 Drawing Sheets

(56) References Cited

U.S. PATENT DOCUMENTS 9,162,555 B2 10/2015 Kodama
9,745,773 B2 8/2017 Halliwell
10,137,944 B2 * 11/2018 Steege ................. B62D 33/037

* cited by examiner

BACKDOOR ASSEMBLIES FOR VEHICLES

TECHNICAL FIELD

The present specification generally relates to vehicle doors and, more specifically, to securing vehicle doors to an automobile frame.

BACKGROUND

Many types of automobiles include trunk spaces, and these trunk spaces are accessible via different types of back doors. For example, trunk spaces of sport utility vehicles (SUVs) are accessible via a tail gate. With this type of back door, the back door is fixed to the vehicle frame via a pair of hinges and a single lock, wherein the back door is rotatable about an axis defined by the hinges when unlocked. However, when locked, the back door does not provide structural rigidity to the automobile frame because the lock and the pair of hinges define a three (3) point structure that is susceptible to torsional forces.

Accordingly, a need exists for improved back door assembly that increase torsional and structural rigidity of the vehicle's frame and thereby improve vehicle's overall responsiveness.

SUMMARY

In one embodiment, a back door assembly for a vehicle includes a door; a pair of hinges that rotatably couple the door to a frame of the vehicle, the pair of hinges define an axis of rotation about which the door is rotatable; and a pair of latching mechanisms configured to secure the door to the frame, the pair of latching mechanisms are spaced apart from the pair of hinges in a vehicle vertical direction when the door is in a closed position, the pair of latching mechanisms are aligned with the pair of hinges in the vehicle vertical direction when the door is in the closed position such that an axis extending through the pair of latching mechanisms is substantially parallel to the axis of rotation of the pair of hinges.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a back door assembly for a vehicle that includes a door, a pair of hinges that rotatably couple the door to a frame of the vehicle such that the door is movable between an open position and a closed position, and a pair of latching mechanisms operable to engage the vehicle frame when and secure the door relative to the frame when the door is moved into the closed position. When secured in the closed position, each of the hinges and each of the latching mechanisms defines a single connection point, such that the back door assembly defines a four point structure that enhances torsional and structural rigidity of the frame of the vehicle and thereby improve vehicle's overall responsiveness.

Figure 1:
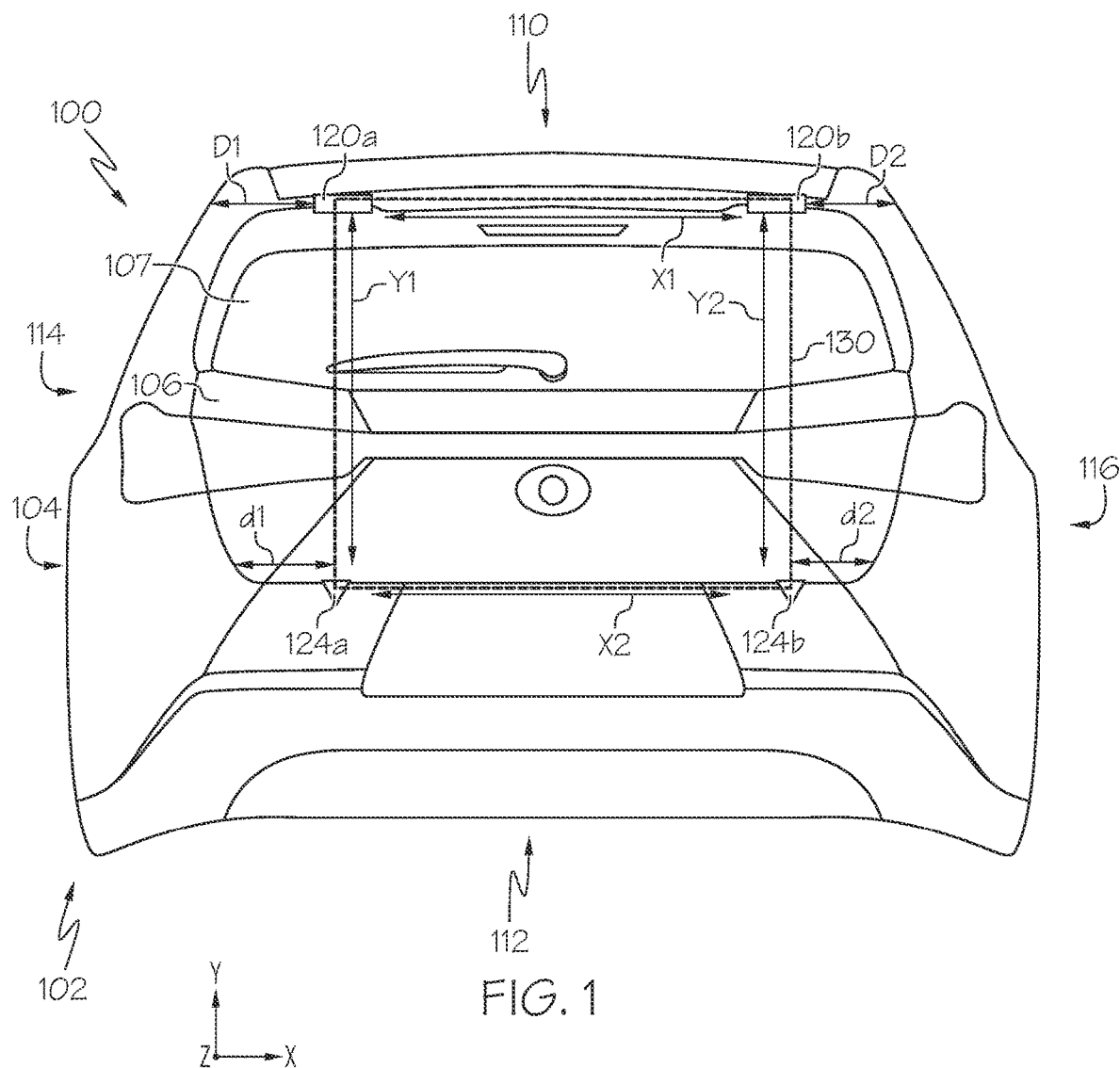
FIG. 1 depicts a rear end of a vehicle having a back door assembly in a closed and locked position, according to one or more embodiments shown and described herein.

As used herein, the term "vehicle longitudinal direction" refers to the forward-rearward direction of the vehicle (i.e., in the +/−vehicle Z direction in the coordinate axes depicted in FIG. 1). The term "vehicle lateral direction" refers to the cross-vehicle direction (i.e., in the +/−vehicle X direction in the coordinate axes depicted in FIG. 1), and is transverse to the vehicle longitudinal direction. The term "vehicle vertical direction" refers to the upward-downward direction of the vehicle (i.e., in the +/−vehicle Y direction in the coordinate axes depicted in FIG. 1). As used herein, "upper", "top", and "above" are defined as the positive Y direction of the coordinate axes shown in the drawings. As used herein, "lower", "bottom", and "below" are defined as the negative Y direction of the coordinate axes shown in the drawings. Also, as used herein, "front" and "forward" are defined as the positive Z direction of the coordinate axes shown in the drawings; whereas "rear" and "rearward" are defined as the negative Z direction of the coordinate axes shown in the drawings. Further, the term "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard," and "outward" refer may be mirrored about the vehicle centerline when evaluating components positioned along opposite sides of the vehicle.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a vehicle 100 having a rear end 102 is illustrated. In particular, FIG. 1 illustrates a back door assembly 104 provided at the rear end 102 of the vehicle 100, according to one or more embodiments described herein. In the illustrated example, the vehicle 100 is an SUV. However, the vehicle 100 depicted in FIG. 1 is just one example vehicle that can suitably incorporate the principles of the present disclosure. Indeed, many alternative designs and configurations of the vehicle 100 may be employed, without departing from the scope of this disclosure.

The back door assembly 104 includes a door 106. As hereinafter described, the door 106 attached to the vehicle 100, but movable relative to the vehicle 100 between a closed position and an open position. FIG. 1 illustrates the door 106 when in the closed position. In the illustrated example, the door 106 includes a window 107. However, the door 106 depicted in FIG. 1 is just one example door that can suitably incorporate the principles of the present disclosure. Indeed, many alternative designs and configurations of the door 106 may be employed, without departing from the scope of this disclosure.

Figure 2:
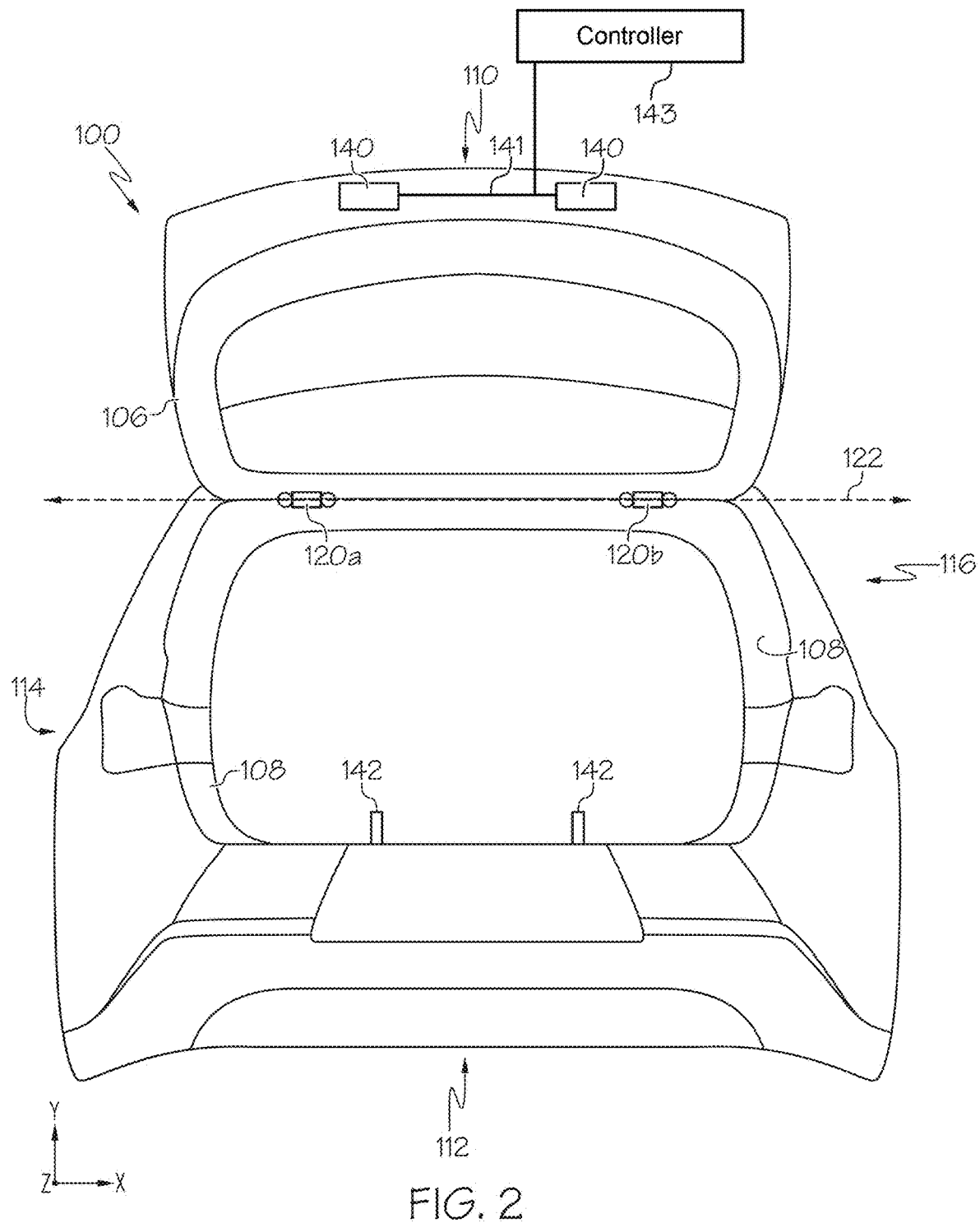
FIG. 2 depicts the back door assembly of FIG. 1 when in an open closed position.

FIG. 2 illustrates the back door assembly 104 of FIG. 1, wherein the door 106 has been moved from the closed position into the open position. As illustrated, the vehicle 100 includes a frame 108 which provides the vehicle 100 with structural rigidity and supports the door 106 and the various other components of the vehicle 100, such as the wheels, the engine, panels of sheet metal, etc. Also, the vehicle 100 has a top side 110, a bottom side 112, a left side 114, and a right side 116.

The back door assembly 104 further comprises a first hinge 120a and a second hinge 120b for rotatably coupling the door 106 to the frame 108 of the vehicle 100. In the illustrated example, the first hinge 120a and the second hinge 120b couple the door 106 to the top side 110 of the frame 108. The first hinge 120a and the second hinge 120b each define an axis of rotation and are mounted on the frame 108 such that they together define a common axis of rotation 122 about which the door 106 may rotate relative to the frame 108.

The first hinge 120a and the second hinge 120b each include a first portion that is attached proximate an upper edge of the door 106 and a second portion that is attached proximate the top side 110 of the frame 108, wherein the first portion and the second portion of the first hinge 120a and the second hinge 120b are rotatable relative to each other about the common axis of rotation 122. In embodiments, the first portions and the second portions of the first hinge 120a and the second hinge 120b are pinned together. In this manner, the door 106 is coupled to the frame 108 and movable relative thereto about the common axis of rotation 122.

In the illustrated example, the first hinge 120a is disposed on the frame 108 at a distance D1 from the left side 114 of the vehicle 100, and the second hinge 120b is disposed on the frame 108 at a distance D2 from the right side 116 of the vehicle 100. In embodiments, the distance D1 and the distance D2 are equal to each other, such that the first hinge 120a and the second hinge 120b are provided equidistantly with respect to the door 106 and the frame 108 of the vehicle 100. In other examples, the distance D1 and the distance D2 are not equal to each other, such that the distance D1 is greater than or lesser than D2, or vice versa.

The back door assembly 104 further comprises a first latching mechanism 124a and a second latching mechanism 124b, which are schematically illustrated in FIG. 1. In the illustrated example, the first latching mechanism 124a is disposed at a distance d1 from a left edge of the door 106 as measured along a lower edge of the door 106, and the second latching mechanism 124b is disposed at a distance d2 from a right edge of the door 106 as measured along the lower edge of the door 106. In embodiments, the distance d1 and the distance d2 are equal to each other, such that the first latching mechanism 124a and the second latching mechanism 124b are provided equidistantly with respect to the door 106 and the frame 108 of the vehicle 100. In other examples, the distance d1 and the distance d2 are not equal to each other, such that the distance d1 is greater than or lesser than d2, or vice versa.

As shown in FIG. 1, the first hinge 120a and the second hinge 120b are spaced apart from each other by a distance X1. Also, the first latching mechanism 124a and the second latching mechanism 124b are spaced apart from each other by a distance X2. In embodiments, the distance X1 between the first hinge 120a and the second hinge 120b is equal to the distance X2 between the first latching mechanism 124a and the second latching mechanism 124b. The first latching mechanism 124a and the second latching mechanism 124b are each vertically spaced from the first hinge 120a and the second hinge 120b. In the illustrated example, the first latching mechanism 124a and the second latching mechanism 124b are each provided proximate to a lower edge of the door 106, and a vertical spacing Y1 between the first hinge 120a and the first latching mechanism 124a is equal to a vertical spacing Y2 between the second hinge 120b and the second latching mechanism 124b. Also, in the illustrated example, the first latching mechanism 124a and the second latching mechanism 124b are vertically aligned with the first hinge 120a and the second hinge 120b, respectively, such that a first vertical axis extending through the first latching mechanism 124a and the first hinge 120a is substantially parallel to a second vertical axis that extends through the second latching mechanism 124b and the second hinge 120b.

In this manner, when the door 106 is in the closed position and when the first latching mechanism 124a and the second latching mechanism 124b are engaged to lock the door 106 in the closed position, the first hinge 120a, the second hinge 120b, the first latching mechanism 124a, and the second latching mechanism 124b define a four point structure 130. In particular, the four point structure 130 is defined by the vertical spacing Y1 between the first hinge 120a and the first latching mechanism 124a, the distance X1 between the first hinge 120a and the second hinge 120b, the vertical spacing Y2 between the second hinge 120b and the second latching mechanism 124b, and the distance X2 between the first latching mechanism 124a and the second latching mechanism 124b. The four point structure 130 provided by the first hinge 120a and the second hinge 120b, together with the first latching mechanism 124a and the second latching mechanism 124b when engaged, adds additional bracing to the vehicle 100 to thereby enhance responsiveness and structural rigidity, which in turn enhances safety and performance. In embodiments, the four point structure 130 may comprise a square geometry where the distances X1,X2 and the vertical spacing Y1,Y2 are all equal to each other. However, the four point structure 130 may comprise non-square geometries, such as rectangular geometries, trapezoidal geometries, etc.

As shown in FIG. 2, each of the first latching mechanism 124a and the second latching mechanism 124b includes a receiver 140 and a striker 142. The receiver 140 includes the locking components that are operable catch, engage, and secure the striker 142, such that the door 106 may be retained in the closed position shown in FIG. 1. The receiver 140 is also operable to disengage the striker 142, such that the door 106 may be moved into the open position shown in FIG. 2.

In embodiments, the receivers 140 of each of the first latching mechanism 124 a and the second latching mechanism 124b are operatively coupled together such that they can be controlled simultaneously. For example, the receivers 140 may be mechanically coupled via a cable or link 141 that is operatively connected to both of the receivers 140, wherein manipulation of the cable or link 141 causes simultaneous disengagement of the receivers 140 from the striker 142 associated therewith. In some examples, the receivers 140 may be electronically coupled via a controller 143 that is electronically connected to each of the receivers 140, and the controller 143 sends a signal to each of the receivers 140 simultaneously instructing the receivers 140 to disengage the striker 142 associated therewith. Where utilized, the controller 143 may communicate with each of the receivers 140 via a wire or via wireless communication. In embodiments, the receivers 140 are both mechanically and electronically coupled to each other.

Regardless of whether the receivers 140 are mechanically or electronically coupled, they may be manipulated simultaneously from the cockpit of the vehicle 100 or from an exterior side of the door 106. For example, a control may be provided in the cockpit of the vehicle 100 that the driver may activate to disengage the receivers 140 from the striker 142 associated therewith to thereby allow the door 106 to move into the open position. Also, a handle may be provided on the exterior side (and/or on the interior side) of the door 106 that the user may activate to disengage the receivers 140 from the striker 142 associated therewith to thereby allow the door 106 to move into the open position. Also, a key hole may be provided on an exterior side of the door 106, such that a user may insert their key in the key hole and turn the key to simultaneously disengage the receivers 140, regardless of whether the receivers 140 are mechanically or electronically coupled.

Figure 3A:
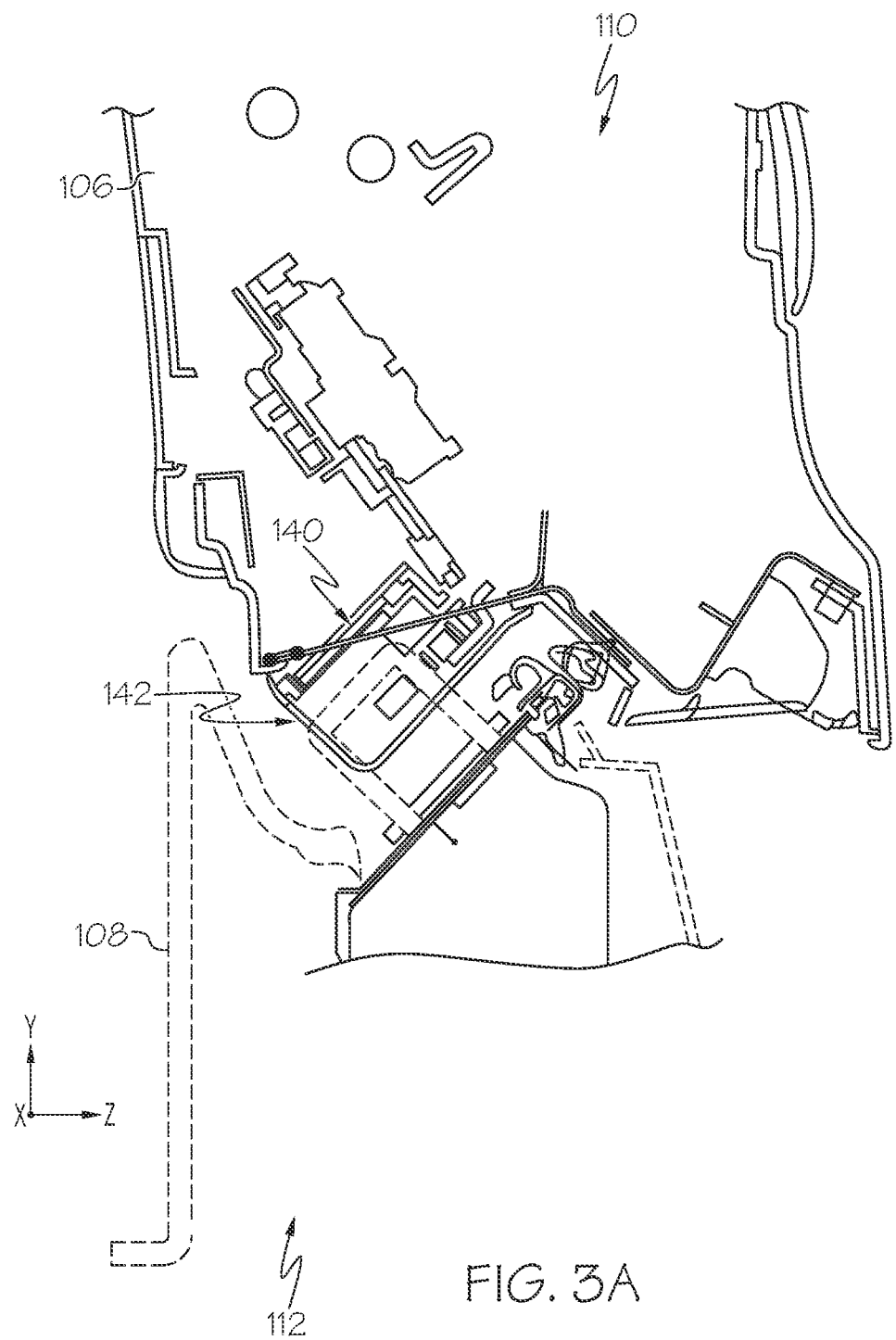
FIG. 3A is a cross-sectional side view of a latching mechanism utilizable with the back door assembly of FIGS. 1 and 2 when in an engaged position.
Figure 3B:
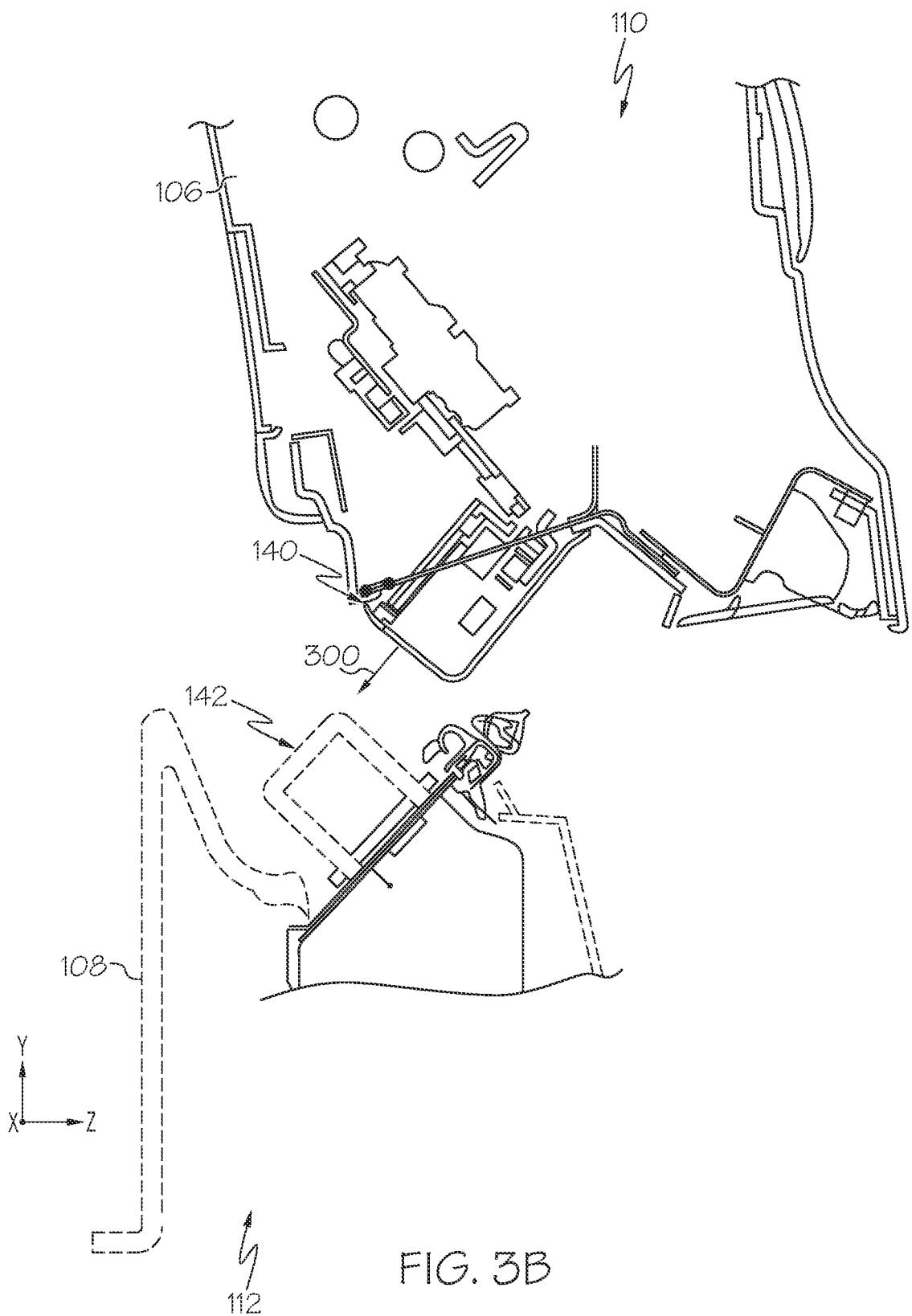
FIG. 3B is a cross-sectional side view of the latching mechanism utilizable with the back door assembly of FIGS. 1 and 2 when in a disengaged position.

FIG. 3A illustrates the receiver 140 when engaging the striker 142, whereas FIG. 3B illustrates the receiver 140 when disengaged from the striker 142. Thus, the door 106 shown in FIG. 3A is locked in the closed position. In FIG. 3B, the door 106 is depicted in an at least partially open position. However, as shown in FIG. 3, the door 106 may be moved into the closed position, such that the receiver 140 moves towards the striker 142, as shown by arrow 300.

From the above, it is to be appreciated that defined herein is a back door assembly for a vehicle that includes a door, a pair of hinges that rotatably couple the door to a frame of the vehicle such that the door is movable between an open position and a closed position, and a pair of latching mechanisms operable to engage the vehicle frame when and secure the door relative to the frame when the door is moved into the closed position. When secured in the closed position, each of the hinges and each of the latching mechanisms defines a single connection point, such that the back door assembly defines a four point structure that enhances torsional and structural rigidity of the frame of the vehicle and thereby improve vehicle's overall responsiveness.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A back door assembly for a vehicle, the back door assembly comprising:
    a door including an upper edge and a lower edge spaced apart from the upper edge, the upper edge and the lower edge extending between a pair of side edges spaced apart from one another, the upper edge, the lower edge, and the pair of side edges circumscribing a window;
    a pair of hinges that rotatably couple the door to a frame of the vehicle, the pair of hinges define an axis of rotation about which the door is rotatable; and
    a pair of latching mechanisms configured to secure the door to the frame, the pair of latching mechanisms are spaced apart from the pair of hinges in a vehicle vertical direction when the door is in a closed position, the pair of latching mechanisms are aligned with the pair of hinges in the vehicle vertical direction when the door is in the closed position such that an axis extending through the pair of latching mechanisms is substantially parallel to the axis of rotation of the pair of hinges,
    wherein the pair of hinges is provided on the upper edge of the door and a top side of the frame, the top side of the frame extending between a left side and a right side of the frame,
    wherein a first hinge of the pair of hinges is provided at a first distance from the left side of the frame and a second hinge of the pair of hinges is provided at a second distance from the right side of the frame.

2. The back door assembly of claim 1, wherein the pair of hinges each comprises a first portion that is attached to the upper edge of the door and a second portion that is attached to the top side of the frame, wherein the first portion and the second portion are rotatable relative to each other.

3. The back door assembly of claim 1, wherein the first distance and the second distance are equal to each other.

4. The back door assembly of claim 1, wherein the first distance and the second distance are not equal to each other.

5. The back door assembly of claim 1, wherein the pair of latching mechanisms each comprises a receiver provided on the door and a striker provided on the frame.

6. The back door assembly of claim 5, wherein the receiver of each of the pair of latching mechanisms is provided at a lower edge of the door.

7. The back door assembly of claim 5, further comprising a link that is operatively coupled to the receiver of each of the pair of latching mechanisms, wherein manipulation of the link causes simultaneous disengagement of the receivers from the striker associated therewith.

8. The back door assembly of claim 5, further comprising a controller that is electronically connected to the receiver of each of the pair of latching mechanisms, wherein the controller is operable to send a signal to each of the receivers simultaneously instructing the receivers to disengage the striker associated therewith.

* * * * *